United States Patent Office 2,865,874
Patented Dec. 23, 1958

2,865,874

INTERPOLYMERS OF ALKYD RESINS, VINYL HALIDES AND VINYL ESTERS

Roger M. Christenson, Whitefish Bay, Wis., assignor to Pittsburgh Plate Glass Company, Allegheny County, Pa., a corporation of Pennsylvania No Drawing. Application November 24, 1953
Serial No. 394,221

12 Claims. (Cl. 260—22)

This invention relates to a method of and a product from interpolymerization of an alkyd resin and a plurality of monomers containing groups of the formula $>C=CH_2$. The invention especially concerns a method and a resultant product wherein an alkyd resin which is a polyester of a mixture of carboxylic acids comprising higher fatty acids and a dicarboxylic acid substantially free of ethylenic unsaturation, with a polyhydric alcohol, is interpolymerized with a plurality of monomers, one of which is an ester of an alcohol and a carboxylic acid, said ester containing a $>C=CH_2$ group and another comprises a similar group but contains a halogen atom on the alpha carbon atom.

Valuable interpolymer resins are obtained by the addition reaction of vinyl chloride and vinyl esters such as vinyl acetate. These are chemically resistant, but are insoluble in most of the cheaper solvents such as xylene and toluene. Therefore, their use as protective coating mediums has been retarded by the high cost of suitable solvents.

It has also been attempted to prepare interpolymers suitable for use as coating media from mixtures of (A) esters of drying oil acids and lower alcohols such as methyl alcohol and (B) monomer systems comprising vinyl chloride and vinyl acetate. Still other attempts have been made to form interpolymers of unbodied drying oil such as linseed oil or soybean oil and mixtures of vinyl chloride and vinyl acetate. In each instance, however, the efforts were not particularly successful, inasmuch as it was found that excessive quantities of free radical initiators or catalysts, such as benzoyl peroxide, were required to induce the reaction to proceed at a reasonable rate and to a reasonable degree of completion. Also, the properties of the product were poor, inasmuch as films thereof were lacking in toughness and in other desirable mechanical properties.

It has been further attempted to styrenate an alkyd resin embodying polyesters of glycerol, fatty acids, and dicarboxylic acids. Success in this operation has only been attained where considerable amounts of a conjugated oil such as tung oil or the fatty acids thereof were included in the base resin, or considerable quantities of alpha-methyl styrene were included with the styrene component of the interpolymer.

It has still further been proposed to prepare physical mixtures of certain alkyd resins and vinyl chloride-vinyl acetate copolymers. These, however, obviously do not involve interpolymerization between the vinyl components and the ethylenically unsaturated groups of the alkyd resin.

The present invention comprises the successful provision of novel interpolymers of (A) alkyd resins containing a fatty acid component, (B) an ester containing a terminal $>C=CH_2$ group, and (C) a vinyl halide. The resultant products are resinous materials which are soluble in aromatic solvents such as xylene or toluene and which can be spread successfully by brushing, spraying, roller coating, or by other methods, to provide films which dry rapidly and provide protective coatings of excellent chemical resistance.

When mixtures of the foregoing constituents are heated together even relatively mildly, the reaction proceeds to a satisfactory degree of completion in a reasonable time. The use of tung oil or alpha-methyl styrene is not required to attain success.

In the practice of the invention, various alkyd resins or polyesters which have been modified with unsaturated fatty acid groups in conventional manner may be employed as starting materials or base resins. These alkyds are usually obtained in well-known manner, by an appropriate esterification reaction between a polyhydric alcohol, a dicarboxylic acid and a higher fatty acid. The fatty acid component may be introduced into the reaction, for example by inclusion in the reaction mixture of a free higher fatty acid such as may be derived from a conventional glyceride oil, e. g. soybean oil, linseed oil, or the like. In many instances, however, it is preferred to react a dicarboxylic acid with a partial ester of glycerol, such as may be derived by the alcoholysis of a glyceride oil with a polyhydric alcohol to form esters containing both fatty acid ester groups and unreacted hydroxyls, the latter of which are present in amounts admitting of reaction with the carboxyls of polybasic acids to form polyester molecules.

Polyhydric alcohols which may be employed in preparing the polyesters of this invention are represented by glycerol, pentaerythritol, mannitol, sorbitol, or the like. Mixtures of any two or more of these alcohols are included. One such mixture would comprise glycerol and pentaerythritol. A mixture providing the effect of these two, along with fatty acid radicals, may be arrived at by the alcoholysis of a glyceride oil such as soya oil with pentaerythritol, to provide a partial ester containing available hydroxyls.

The higher fatty acid or monocarboxylic acid component of the alkyd resin should be at least partially unsaturated. The acids, or their partial esters, such as those derived by alcoholysis of a conventional glyceride oil such as soya oil, linseed oil, tung oil, cotton seed oil, or the like contain such unsaturation in adequate degree.

The major portions of the dicarboxylic or polycarboxylic acids are free of ethylenic unsaturation and such like reactive groups other than the carboxyls. However, in some instances, a small portion, e. g. 1 to 10 or even 20 percent of the dicarboxylic acids may contain alpha-beta ethylenic unsaturation. Saturated acids suitable for use in forming the alkyd ester comprise phthalic acid (in which the double bonds are so non-reactive as not to take part in the reaction) terephthalic acid (which may be regarded as saturated for like reasons); aliphatic dicarboxylic acids such as succinic acid, adipic acid, sebacic acid, azelaic acid and the like. Unsaturated acids which may be used in small amounts with any of the above acids comprise maleic acid, fumaric acid, itaconic acid, aconitic acid, citraconic acid and others. The derivatives of these acids such as may be obtained by replacement of one or more of the hydrogen groups of the hydrocarbon portion of the acids with halogens such as chlorine or by hydrocarbon groups such as methyl, ethyl or the like are within the purview of the invention.

The several components of the alkyds or polyesters are reacted by the conventional techniques of the alkyl resin art. Usually the reaction is effected by heating the several components as above described in order to effect evolution of water of reaction, which evolution constitutes a criterion of reaction. The reaction may be promoted by the inclusion of a catalyst such as litharge, a sulfonic acid or other well-known catalytic medium. Preferably, the reaction is conducted in an appropriate chamber under a blanket of carbon dioxide, or nitrogen, in order to prevent undue oxidational effects. The reaction is continued until water of reaction ceases to evolve, or until an appropriately low acid value, or a desired viscosity is attained. In any event, the reaction is not continued so long as to produce infusible, insoluble polyester bodies. In many instances, oil modified alkyds or polyesters can be obtained as commercial products already available on the market. Alkyds containing about 55 to 80 percent by weight of oil, or an equivalent amount of oil acids are preferred.

The monomer systems of this invention preferably include a plurality of ethylenically unsaturated compounds each containing a terminal $>C=CH_2$ group attached to a negative group. Vinyl halides such as vinyl chloride and vinylidene chloride are preferred as one component. These, by interpolymerization reaction with the alkyd body, tend to increase the hardness, mar-resistance, chemical resistance and such like properties of the body. A second component of the monomer system preferably comprises an ester containing a $>C=CH_2$ group in terminal position and being of a monohydric alcohol. Of the numerous esters which fall within the scope of the invention, vinyl acetate is presently preferred because it is relatively inexpensive and is commonly available. It is also relatively reactive and it tends quite strongly to promote internal plasticization of the product.

Other esters use of which is also included by the invention comprise those of ethylenically unsaturated monocarboxylic acids, such as acrylic acid or methacrylic acid.

The alcohol component of the monomer ester should contain a $>C=CH_2$ group if the acid contains no reactive ethylenic group but in those instances where the acid contains a reactive ethylenic group, either saturated or unsaturated alcohols may be employed.

Saturated alcohols which may be reacted with unsaturated acids to form suitable esters, of course, include methyl alcohol, ethyl alcohol; while unsaturated alcohols include allyl and methallyl or the like alcohols. The monomer ester may also be of a saturated acid such as acetic acid (above mentioned), phthalic acid, terephthalic acid, succinic acid, adipic acid or the like, with an unsaturated alcohol such as the hypothetical vinyl alcohol, allyl alcohol or methallyl alcohol and the like. Examples of the ester monomers are:

| | |
|---|---|
| Vinyl acetate | Allyl acetate |
| Methyl acrylate | Methallyl acetate |
| Ethyl acrylate | Allyl propionate |
| Methyl methacrylate | Diallyl phthalate |
| Allyl acrylate | Diallyl succinate |
| Methallyl acrylate | | and others.

The ester monomer component is especially desirable in the interpolymerizable mixture for purposes of imparting internal plasticity to the interpolymer products, and improving mutual compatibility of the alkyl base resin and vinyl chloride. By inclusion of an internal plasticizer, the toughness and adhesive properties of the interpolymer products are substantially improved. In some instances, the solubility characteristics of the materials in the solvents are likewise substantially increased. Usually, the ester-monomer component employed in the practice of the present invention is a liquid material and is soluble in or compatible with the other monomer component (halide) as well as the alkyd component. The monomer system may comprise about 20 to 80 percent by weight of the halide component, the rest, of course, being the ester monomer. A preferred range, however, is about 25 to 75 percent of the halide.

In some instances, it may be desirable to include small amounts of free carboxylic acids having ethylenic unsaturation and being represented by acrylic acid and methacrylic acid. These probably constitute added monomer components. It has been found that their use tends to increase the adhesion of the interpolymer products when the latter are employed as coating media for surfaces of metal, wood or the like.

In the preparation of interpolymers of (A) alkyd bodies such as those previously described (B) vinyl halides and (C) ethylenically unsaturated monomers, it is often desirable to include a catalyst of the free radical initiator type such as benzoyl peroxide, tertiary butyl hydroperoxide, cumene hydroperoxide, lauroyl peroxide, isopropyl percarbonate, and cyclohexanone peroxide. Still other catalysts include free radical initiators such as alpha, alpha-azodiisobutyronitrile, diethylaniline, or promoters or activators such as cobalt naphthenate and the like may be included with the catalysts. When catalysts such as those above referred to are employed to promote the speed of the reaction, substantial ranges in catalyst proportions are permissible. For example, for catalysts such as benzoyl peroxide, the range includes about one to ten percent by weight based upon the interpolymerizable mixture. A preferred range of catalyst is about 1 to 3 percent by weight based upon the interpolymerizable components.

Various embodiments of apparatus and procedures may be employed in conducting the reaction. For example, the several components of the reaction mixture may be conducted as a continuous stream through a tube which is subjected to heating by appropriate means in order to effect a continuous reaction. Unreacted components may be continuously or intermittently distilled from the reaction product at the conclusion of the reaction. The reaction may also be conducted as a batch operation in conventional kettles, autoclaves or the like apparatus. The apparatus should be strong enough to contain the vinyl chloride, at reaction temperatures and preferably is equipped with agitators, heating means such as electrical mantels, means for determining the temperature of reaction and means for periodically taking samples in order to determine viscosity, acid value, or other criteria of completion of the reaction.

In conducting the reaction, any reasonable temperature which induces a sufficiently rapid interpolymerization without inducing undue darkening of the product, or decomposition reactions may be employed. The temperatures of reaction usually should be below about 150° C. and above 50° C. and the preference is for temperatures somewhat below 100° C. for example, in the range of about 60 to 85° C. At the temperature of about 75° C. the reaction proceeds at a reasonable rate and at the same time, the tendency of the product to darken is not great. Higher temperatures are admissible, but in some instances, there is a substantial tendency of the product to darken. This tendency, however, can be substantially reduced by the inclusion in the reaction mixture of appropriate inhibitors. One such inhibitor is sold by the Advance Solvents Corporation under the trade name of XB–12. This material is understood to be essentially tin-laurate. Still another inhibitor of discoloration is sold by the Shell Chemicals Company as a commercial product under the trade name RN–34. It is understood to contain a liquid glycidyl polyether product of low epoxide number obtained by condensation of p,p'-isopropylidene-diphenol and epichlorohydrin, or similar materials. The inhibitor may be employed in small amounts, e. g. about 0.5 to 5 percent the weight based upon the interpolymerizable mixture. In any event, it is usually undesirable to include in the reaction mixture more of the inhibitor than is required reasonably to reduce the tendency of the mixture to darken, which tendency obviously can be observed by visual inspection of the mixture.

In the practice of the present invention, it is preferable to start with an alkyd resin of rather long oil length, for example an alkyd resin containing about 50 to 75 percent of an appropriate glyceride oil or the equivalent thereof in fatty acids of such oil. Substantially any alkyd resin containing the oil components in the requisite proportions and being reasonably soluble and fusible may be employed. As previously indicated, this base resin may be a commercial product many of which are now available. However, the following examples illustrate the preparation of a few such base alkyds.

BASE RESIN "A"

This example constitutes a typical example illustrating the preparation of a base alkyd resin. The charge comprised:

2,170 grams of fractionated soya fatty acids of an iodine value of 145–160
885 grams of phthalic anhydride
751 grams of pentaerythritol
140 grams of xylene The mixture was introduced into a three necked flask fitted with a thermometer, an azeotropic separator and a stirrer. The reaction mixture was heated to a temperature within a range of 450–460° F. and held for three hours and twenty minutes while the xylene was refluxed to remove the water of esterification. At the end of this time, the resultant modified alkyd resin was thinned with xylene to yield a solution of a 60.5 percent by weight content of non-volatiles and having a viscosity of B–C, an acid value of 11.4 and a Gardner color of 8–9.

BASE RESIN "B"

This alkyd resin comprised soya oil 65 percent by weight, with pentaerythritol and phthalic acid in amount to provide 34 percent pentaerythritol phthalate and 1 percent excess pentaerythritol. The alkyd was cooked to a body of W when it was diluted with high flash naphtha to a solids content of 60 percent based on the mixture.

BASE RESIN "C"

The charge in this instance, comprised soya oil, glycerol, phthalic acid, pentaerythritol and maleic acid. The composition comprised:

| | Percent by weight |
|---|---|
| Soya oil | 65 |
| Glycerol phthalate | 29.4 |
| Pentaerythritol maleate | 3.7 |

The mixture also included the polyol components in an amount to provide a 1.9 percent by weight excess of polyol. The mixture was esterified to provide an alkyd resin and xylene was added in small amount to provide a product of 95 percent solids.

The alkyd resins as prepared in Examples A, B or C or similar alkyd bodies may be dissolved in appropriate mixtures of monomers, namely vinyl halide, e. g. vinyl chloride and a vinyl ester such as vinyl acetate over a substantial range of proportions. This range may extend for example from approximately 10 to 50 percent by weight based upon the interpolymerizable components of the mixture. In most instances, however, a preferred range is from approximately 25 to 40 percent by weight based upon the polymerizable components. Satisfactory results have been obtained with mixtures containing 33⅓ percent by weight of the interpolymerizable mixture of the alkyd resin.

Substantial variations in the relative proportions of the two monomer components (vinyl halide such as vinyl chloride and vinyl ester such as vinyl acetate) are contemplated. A suggested range for either monomer is about 20 to 80 percent by weight of the monomer mixture, the rest of the mixture, of course, being the other monomer.

These monomers may be mixed with the soluble alkyd body or polyester with or without added solvents such as xylene or toluene.

The preparation of interpolymers of the foregoing base resins and the monomer systems in accordance with the provisions of the present invention is illustrated by the following examples.

Example I

This example illustrates the preparation of a typical interpolymer product. The apparatus comprised a pressure vessel having heating means. Such apparatus was employed in subsequent examples. The charge comprised:

375 grams alkyd resin which was 60 percent pentaerythritol soyate and 40 percent pentaerythritol phthalate
625 grams vinyl chloride
625 grams vinyl acetate
50 grams benzoyl peroxide
875 grams xylene The reaction was conducted at 75° C. for 8 hours. The excess of monomer was then removed by distillation. In all subsequent examples excess monomer was likewise so removed. A yield of 1000 grams of interpolymer containing 62.5 percent by weight vinyl chloride and vinyl acetate was obtained. This material at a concentration of 48.3 percent by weight in xylene had a viscosity of V+ and a Gardner color of 5–6. This material could be spread and dried in the air by baking, on surfaces of metal or wood to provide hard chemically resistant films useful as protective coatings.

Example II

In this example, the solution of alkyd resin described as Base Resin B was employed in an amount of 450 grams, in admixture with 450 grams of vinyl acetate and 450 grams of vinyl chloride. The mixture was dissolved in 1020 grams of xylene, was catalyzed with 27 grams of benzoyl peroxide and was stabilized against possible discoloration with 12 grams of XB–12 (tin dilaurate). It was then heated for 5 hours at 212° F. excess monomers were distilled and xylene was added to provide a product of viscosity of G at a solids content of 47.1 percent by weight in xylene. The color of the solution was 6+ on the Gardner scale. The combined monomer content was 47.3 percent by weight.

The properties of films of this material were as follows:

| | |
|---|---|
| Sward hardness on glass | 16. |
| Sward hardness on steel | 20. |
| Flexibiilty on a ½ inch tapered mandrel [1] | Over 20%. |
| Alkali resistance | 20 hours. |
| Adhesion | (Good.) |

[1] This device was employed in making flexibility determinations in the succeeding examples.

The material was useful for protectively coating wood and iron or steel or the like materials.

Example III

In this example, a charge was prepared embodying the solution of alkyd resin designated as C. The charge was of the following composition:

| | Grams |
|---|---|
| Alkyd resin solution (C) | 400 |
| Vinyl acetate | 400 |
| Vinyl chloride | 400 |
| Benzoyl peroxide | 24 |
| Xylene | 1200 |

This mixture was heated for 8 hours at 167° F. or until a viscosity of A was attained at a solids content of 39.6 percent by weight in xylene. Excess monomers were distilled before the xylene was added. The solution had a Gardner color of 4. The combined monomer content was 48.7 percent.

Films of these materials exhibited the following properties:

| | |
|---|---|
| Sward hardness on glass | 12. |
| Sward hardness on steel | 10. |
| Flexibility | Greater than 20%. |
| Alkali resistance | 4 hours. |
| Adhesion | (Good.) |

The material was valuable for coating iron, steel, wood or the like in order to decorate, or to protect the same,

Example IV

The alkyd resin solution in this example was the same as that of Example II. The composition of the interpolymerizable mixture was as follows:

| | Grams |
|---|---|
| Alkyd resin solution | 625 |
| Vinyl acetate | 625 |
| Vinyl chloride | 625 |
| Benzoyl peroxide | 37.5 |
| Xylene | 625 |

This mixture was interpolymerized at 167° F. for 8 hours. Excess monomers were distilled and xylene was added until a viscosity of C was attained at a solids content of 40.1 percent. The color of this body was 5+ on the Gardner scale. The combined monomer content was 49.4 percent by weight.

Films of this material exhibited the following properties:

| | |
|---|---|
| Set [1] | 17 min. |
| Cotton free [1] | 42 min. |
| Print free [1] | 1½ hrs. |
| Sward hardness on glass | 14. |
| Sward hardness on steel | 18. |
| Flexibility | Over 20%. |
| Alkali resistance | 5½ hrs. |
| Adhesion | (Good.) |

[1] These are conventional tests. "Set" is the time in minutes when the films cease to adhere to the finger as a liquid. "Cotton free" means thhat cotton fibers will not adhere to the film when pressed against it. "Print free" indicates that newspaper does not adhere to or leave marks on the film when pressed against it.

These films are useful as protectives against weathering, or chemicals and, if the material is pigmented, are useful for decorative purposes.

Example V

Alkyd resin solution designated as C constituted the base resin in this example. The composition of the interpolymerizable mixture was as follows:

| | Grams |
|---|---|
| Base resin solution (C) | 450 |
| Vinyl acetate | 450 |
| Vinyl chloride | 450 |
| Catalyst (benzoyl peroxide) | 1020.0 |
| Tin dilaurate (XB12) | 12 |

This material was heated for 16 hours at 212° F. and addition reaction between the ethylenic groups in the mixture occurred. The excess monomers were distilled and xylene was added to provide a solution which at a solids content of 39.7 percent, exhibited a viscosity of A+ and a Gardner color of 9+. The combined monomer content was 54.7 percent by weight.

The drying characteristics of this material in air were as follows:

| | | |
|---|---|---|
| Set time | min | 15 |
| Cotton free | hrs | 2 |
| Print free | hrs | 5½ |

The characteristics of the films after drying were as follows:

| | |
|---|---|
| Sward hardness on glass | 8. |
| Sward hardness on steel | 4. |
| Flexibility | Greater than 20%. |
| Alkali resistance | 3½ hrs. |
| Adhesion | (Good.) |

The materials provided fast-drying protective coatings.

Example VI

The alkyd base resin in this example was a solution prepared in accordance with method B as previously given. The composition was as follows:

| | | |
|---|---|---|
| Base resin solution (B) | grams | 625 |
| Vinyl acetate | do | 625 |
| Vinyl chloride | do | 625 |
| Benzoyl peroxide | do | 50 |
| Xylene | do | 625 |
| Temperature of reaction | °F | 167 |
| Time of reaction | hrs | 8 |

Excess monomers were distilled and the material when diluted with xylene to a solids content of 43.2 percent by weight, exhibited a viscosity of K+ and a Gardner color of 5+. The combined monomer content of the interpolymer was 57.1 percent by weight.

The air drying characteristics of films of this material were as follows:

| | Minutes |
|---|---|
| Set | 9 |
| Cotton free | 25 |
| Print free | 85 |

The characteristics of the resultant films were as follows:

| | |
|---|---|
| Sward hardness on glass | 22. |
| Sward hardness on steel | 18. |
| Flexibility | Greater than 20%. |
| Alkali resistance | 10½ hrs. |

The material could be used to form protective and decorative coatings on surfaces of solids.

Example VII

The alkyd solution in this example was the same as B previously given. The composition of the interpolymerizable mixture was as follows:

| | | |
|---|---|---|
| Base Resin solution (B) | grams | 400 |
| Vinyl acetate | do | 400 |
| Vinyl chloride | do | 400 |
| Benzoyl peroxide | do | 24 |
| Xylene | do | 1040 |
| Temperature of reaction | °F | 167 |
| Time of reaction | hrs | 16 |

Excess monomers were distilled off. The interpolymer product when diluted with xylene to a solids content of 45.7 percent, exhibited a viscosity of N and a Gardner color of 4+. The combined monomer content was 55.2 percent by weight.

Example VIII

The interpolymerizable mixture in this example was of the following composition:

| | | |
|---|---|---|
| Base resin (C diluted with xylene—to a total solids of 60%) | grams | 400 |
| Vinyl acetate | do | 400 |
| Vinyl chloride | do | 400 |
| Benzoyl peroxide | do | 36 |
| Xylene | do | 1200 |
| Reaction temperature | °F | 167 |
| Reaction time | hrs | 8 |

Excess monomers were distilled. The resultant interpolymer product when diluted with xylene to a solids content of 46.6 percent by weight, was of a viscosity of G+ and a Gardner color of 3+. The combined monomer content of the interpolymer was 59.1 percent by weight.

The drying characteristics of films of this material were as follows:

| | Minutes |
|---|---|
| Set | 32 |
| Cotton free | 55 |
| Print free | 75 |

The characteristics of the films were:

| | |
|---|---|
| Sward hardness on steel | 14. |
| Sward hardness on glass | 12. |
| Flexibility | Greater than 20%. |
| Alkali resistance | 3 hrs. |
| Adhesion | (Good.) |

The following constitutes a pigmented coating composition embodying an interpolymer resin product prepared in accordance with the provisions of the present invention.

*Example IX*

The composition comprised:

| | Percent by weight |
|---|---|
| Interpolymer[1] | 20 |
| Melamine-formaldehyde solids | 2.8 |
| Whiting | 24.2 |
| Barytes | 16.3 |
| Hydrated clay | 16.9 |
| Lithopone | 10.5 |
| Lampblack | 0.3 |

[1] The alkyd resin of the interpolymer was Base Resin B. The interpolymer comprised:

| | Grams |
|---|---|
| Base Resin B | 625 |
| Vinyl chloride | 625 |
| Vinyl acetate | 625 |
| Benzoyl peroxide | 37.5 |

A solvent system for these solids comprised:

| | Percent by weight |
|---|---|
| High flash naphtha | 27.7 |
| Xylene | 69.3 |
| Butanol | 3 |

The mixture was reacted at 167° F. for 8 hours. Excess monomers were then distilled. The solids and the solvent were mixed in the proportions of 60.4 percent by weight solids, 37.9 percent solvent and to these were added 1.7 percent by weight of a mixture comprising:

| | Parts by weight |
|---|---|
| Aluminum stearate gel | 40 |
| Lecithin solution (50 percent concentration) | 40 |
| A-5 stabilizer (low molecular weight polyester of p,p'-isopropylidene diphenol and epichlorohydrin) | 20 |

This mixture was reduced to a viscosity of 15–17 seconds (determined with a number 4 Ford cup) and it was then applied as a spray to a test panel. It could be dried by air or by baking and was found to constitute a good primer material with excellent resistance to weathering and to high humidity.

*Example X*

A further pigmented coating composition was prepared as follows:

The interpolymer was the same as in Example IX except that the benzoyl peroxide was employed in an amount of 50 grams. This interpolymer product in a proportion of 55.8 percent was mixed with 44.2 percent (percentages by weight) of titanium dioxide. This mixture constituted the solids component of a mixture comprising 57.6 percent by weight solids and 42.4 percent by weight of xylene. To this mixture was added 2 percent by weight based upon the solids content of the foregoing mixture, of A-5 stabilizer. The composition was reduced with xylene to a consistency of 26 seconds on a number 4 Ford cup. The reduced composition was then applied by spray to test panels and air dried. The resultant films were flexible and of excellent chemical resistance to water and to alkali as well as gasoline and alcohol. A 1,000 hour weather-o-meter exposure did not materially affect the film.

*Example XI*

In this example, equal parts of dehydrated castor oil and soya oil were reacted with phthalic anhydride and glycerol the latter being in a 3.2 molecular percent excess. The conditions of reaction were those conventional in the preparation of alkyd resins. Reaction was continued until a viscosity of U at a solids content of 60 percent by weight in naphtha was obtained; 10 grams of the resultant resin was mixed with 10 grams of vinyl acetate and 10 grams of vinyl chloride. The mixture was stabilized with 0.3 gram of glycidyl polyether stabilizer (RN–34) and was catalyzed with 1.2 grams of benzoyl peroxide. The polymerizable mixture was cooked under an inert atmosphere for 15 hours at 100° C. to provide a clear though dark resinous body which was soluble in hydrocarbons and which when spread as a film and air dried, had a hardness of 16 on the Sward scale.

*Example XII*

The oil component of the base resin was linseed oil and the dicarboxylic acid was primarily phthalic acid but a small amount of maleic acid was also included. A mixture was prepared comprising 65 percent linseed oil. The mixture further comprised phthalic acid, maleic acid and glycerol in such proportions as to provide 29.7 grams of phthalic glyceride and 3.3 percent maleic glyceride plus a 2 percent by weight excess of glycerol. The mixture was heated in accordance with conventional techniques involved in the preparation of alkyd resins until a product having a viscosity of X+ at 64.6 percent by weight solids content in naphtha was attained. An interpolymerizable mixture comprising:

| | Grams |
|---|---|
| Above base resin | 13.33 |
| Vinyl chloride | 13.33 |
| Vinyl acetate | 13.33 |
| Xylene | 31.24 |
| Tin laurate (XB12) | 0.34 |
| Benzoyl peroxide | 1.8 | was prepared.

The mixture was polymerized in conventional manner for 16 hours at 100° C. The product was a clear solution which when spread provided clear and flexible films.

In the several preceding examples, phthalic acid can be replaced by a stoichiometrically equivalent amount of a saturated acyclic dibasic acid such as succinic acid, adipic acid, azelaic acid, sebacic acid, or the like.

Phthalic acid or similar non-ethylenic dicarboxylic acid containing one or more halogen atoms such as chlorine atoms substituted for hydrogen may be employed in place of phthalic acid. In the examples, phthalic acid may be replaced by terephthalic acid.

In the monomer systems of the preceding Examples I through XII, vinyl acetate may be replaced by other vinyl esters containing a $>C=CH_2$ group. Such esters include vinyl propionate, vinyl acrylate, vinyl methacrylate, and vinyl esters of higher fatty acids such as those of soya oil. Still other esters which may be employed as ester monomers in preparing the mixtures in the examples may be obtained by esterification action between unsaturated alcohols and unsaturated carboxylic acids. Examples of such esters include allyl acrylate and allyl methacrylate and others.

Vinyl chloride in the preceding examples can be replaced by vinylidene chloride or other halides of organic compounds containing terminal $>C=CH_2$ groups.

The embodiments of the invention herein described are to be considered as being by way of illustration. It will be apparent that numerous modifications may be made therein without departure from the spirit of the invention or the scope of the appended claims.

I claim:

1. An interpolymer which is soluble in aromatic hydrocarbons and which will dry to form durable protective films upon surfaces, which interpolymer is an addition product of a mixture consisting of (A) an alkyd resin which is the esterification product of a mixture of a polyhydric alcohol, a dicarboxylic acid component substantially free of ethylenic unsaturation and a fatty acid of an unsaturated glyceride oil, (B) vinyl acetate and (C)

vinyl chloride, said alkyd resin being present in an amount of about 10 to 50 percent by weight based upon the interpolymerizable component, the rest of the mixture being vinyl acetate and vinyl chloride.

2. An interpolymer body obtained by addition reaction between a mixture consisting of (A) a polyester of glycerol and phthalic acid, which ester has been modified by an unsaturated acid from glyceride oil, (B) vinyl acetate, and (C) vinyl chloride, said polyester being present in an amount of about 10 to 50 percent by weight based upon the interpolymerizable components, the rest of the mixture being the vinyl acetate and vinyl chloride.

3. As a new product the interpolymer consisting of (A) an alkyd resin obtained by esterification reaction of a mixture of a glyceride oil containing unsaturated fatty acids, a dicarboxylic acid free of ethylenic groups and a polyhydric alcohol, the fatty acids being equivalent upon the basis of alkyd resin to about 55 to 80 percent by weight of glyceride oil, the rest of the interploymer being a monomer mixture consisting of (B) vinyl acetate and (C) vinyl chloride, the vinyl chloride constituting about 20 to 80 percent of the monomer mixture, said interpolymer being soluble in aromatic hydrocarbons and being adapted to dry when spread as a film upon a surface, to provide a chemically resistant coating, said alkyd resin being present in the mixture in an amount of about 10 to 50 percent by weight based upon the interpolymerizable components.

4. As an article of manufacture, a solid body having a surface film of chemically resistant interpolymer consisting of (A) an alkyd resin which is an esterification product of a mixture of a polyhydric alcohol, a dicarboxylic acid free of ethylenic unsaturation and a drying oil acid (B) vinyl acetate (C) vinyl chloride, said alkyd resin being present in an amount of about 25 to 40 percent by weight based upon the interpolymerizable components, the vinyl acetate and vinyl chloride constituting the rest of the mixture.

5. The method of forming a novel and useful coating medium for protecting the surfaces of solid bodies which comprises subjecting to interpolymerization by addition reaction a mixture consisting of (A) an alkyd resin which is the esterification product of a mixture of a polyhydric alcohol, a dicarboxylic acid free of ethylenic unsaturation and a fatty acid of an unsaturated glyceride oil, (B) a monomeric ester of a class consisting of vinyl acetate, methyl acrylate, ethyl acrylate, methyl methacrylate, allyl acrylate, methallyl acrylate, allyl acetate, methallyl acetate and allyl propionate and (C) a halide of a class consisting of vinyl chloride and vinylidene chloride, said alkyd resin being present in an amount of about 25 to 40 percent by weight based upon the interpolymerizable components.

6. A method of forming a novel and useful coating medium adapted, when applied to a surface to be coated, to dry to form protective films upon the surface, which method comprises the step of interpolymerizing a mixture consisting of (A) an alkyd resin which is an esterification product of a mixture of soya oil acids, said acids being present in an amount upon the basis of the alkyd resin, equivalent to about 55 to 80 percent by weight of glyceride oil, a polyhydric alcohol and phthalic anhydride and a monomer system consisting of (B) vinyl acetate and (C) vinyl chloride, the vinyl chloride comprising 20 to 80 percent by weight of the monomer system, said alkyd resin being present in an amount of about 25 to 40 percent by weight based upon the interpolymerizable components.

7. The method of forming an interpolymer product soluble in aromatic hydrocarbons and being adapted for use as a protective film upon surfaces of solid bodies, which comprises the step of heating a mixture consisting of (A) an alkyd resin which is an esterification product of a mixture of a fatty acid of a drying oil, a polyhydric alcohol and phthalic acid, and a monomer mixture consisting of (B) an ester of a class consisting of vinyl acetate, methyl acrylate, ethyl acrylate, methyl methacrylate, allyl acrylate, methallyl acrylate, allyl acetate, methallyl acetate and allyl propionate, (C) a vinyl halide and (D) a free radical initiator, said alkyd resin being present in an amount of about 25 to 40 percent by weight based upon the interpolymerizable components.

8. An interpolymer of a mixture consisting of (A) an alkyd resin prepared by condensation of a mixture of a polyhydric alcohol, a higher ethylenically unsaturated fatty acid component of a glyceride oil, and a saturated dicarboxylic acid free of ethylenic groups, (B) a monohydric alcohol ester of a carboxylic acid, said ester being of a class consisting of vinyl acetate, methyl acrylate, ethyl acrylate, methyl methacrylate, allyl acrylate, methallyl acrylate, allyl acetate, methallyl acetate and allyl propionate, and (C) a halide of a compound of the group consisting of vinyl halide and vinylidene halide, said alkyd resin being present in an amount of about 10 to 50 percent by weight based upon the mixture of interpolymerizable components, said interpolymer being soluble in aromatic hydrocarbons and being adapted to dry to form a protective film on a solid surface.

9. An interpolymer soluble in aromatic hydrocarbons and being suitable for use as a coating medium, said interpolymer being the addition product of a mixture consisting of (A) an alkyd resin obtained by esterification reaction of a mixture of a polyhydric alcohol, a dicarboxylic acid free of ethylenic unsaturation and a higher fatty acid component of a glyceride oil containing an ethylenic group, the acid being present in an amount upon the basis of the alkyd resin equivalent to about 55 to 80 percent by weight of glyceride oil and (B) a monomer mixture consisting of (I) a monocarboxylic acid ester of a monohydric alcohol, said ester being of a class consisting of vinyl acetate, methyl acrylate, ethyl acrylate, methyl methacrylate, allyl acrylate, methallyl acrylate, allyl acetate, methallyl acetate, and allyl propionate, and (II) a halide of a group consisting of a vinyl halide and vinylidene halide, said alkyd resin being present in an amount of about 25 to 40 percent by weight based upon the interpolymerizable component of the mixture.

10. The interpolymer product as defined in claim 3 in which the drying oil component is soya oil.

11. The interpolymer product as defined in claim 3, in which the glyceride oil component is soya oil and the dicarboxylic acid component is phthalic anhydride.

12. The interpolymer product as prepared by the method of claim 7 said product being diluted with an aromatic hydrocarbon and mixed with a pigment to provide a decorative and protective coating material.

References Cited in the file of this patent

UNITED STATES PATENTS

| | | |
|---|---|---|
| 2,255,313 | Ellis | Sept. 9, 1941 |
| 2,626,250 | Petropoulos et al. | Jan. 20, 1953 |

UNITED STATES PATENT OFFICE
CERTIFICATE OF CORRECTION

Patent No. 2,865,874 December 23, 1958

Roger M. Christenson

It is hereby certified that error appears in the printed specification of the above numbered patent requiring correction and that the said Letters Patent should read as corrected below.

Column 2, line 61, for "ethvl" read -- ethyl --; line 64, for "alkyl" read -- alkyd --; column 3, line 72, for "carboylic" read -- carboxylic --; column 7, line 47, Example V, for Catalyst (benzoyl peroxide) - - - - - - 1020.0 read

Catalyst (benzoyl peroxide) - - - - - - 27.0

Xylene - - - - - - - - - - - - - - - - 1020.0

Signed and sealed this 14th day of July 1959.

(SEAL)

Attest:

KARL H. AXLINE
Attesting Officer

ROBERT C. WATSON
Commissioner of Patents